United States Patent [19]
Konno et al.

[11] Patent Number: 5,434,835
[45] Date of Patent: Jul. 18, 1995

[54] OPTICAL DISK APPARATUS

[75] Inventors: Hisashi Konno; Suguru Takishima; Takashi Morita; Toshiyuki Kase; Masahiro Oono; Koichi Maruyama; Masato Noguchi; Makoto Iki, all of Tokyo, Japan

[73] Assignee: Asahi Kogaku Kogyo Kabushiki Kaisha, Tokyo, Japan

[21] Appl. No.: 98,252

[22] Filed: Jul. 29, 1993

Related U.S. Application Data

[63] Continuation of Ser. No. 788,992, Nov. 7, 1991, abandoned.

[30] Foreign Application Priority Data

Nov. 7, 1990 [JP] Japan ............... 2-303391
Nov. 14, 1990 [JP] Japan ............... 2-309762
Nov. 14, 1990 [JP] Japan ............... 2-309763

[51] Int. Cl.⁶ ............................................. G11B 7/09
[52] U.S. Cl. .......................... 369/44.28; 369/44.41; 369/44.42; 369/44.37; 369/112
[58] Field of Search .............. 369/44.28, 44.41, 44.11, 369/44.14, 44.21, 44.18, 44.32, 112, 119, 44.34, 44.47, 44.37; 250/201.5

[56] References Cited

U.S. PATENT DOCUMENTS

| | | | |
|---|---|---|---|
| 4,815,060 | 3/1989 | Nomura | 369/44.42 |
| 4,866,688 | 9/1989 | Ohtake et al. | 369/44.28 |
| 5,017,786 | 5/1991 | Takagi | 369/44.41 |
| 5,031,165 | 7/1991 | Fujita | 369/44.11 |
| 5,097,458 | 3/1992 | Suzuki | 369/44.34 |
| 5,113,386 | 5/1992 | Whitehead et al. | 250/201.5 X |

FOREIGN PATENT DOCUMENTS 59-191143  10/1984  Japan.

OTHER PUBLICATIONS

English Language Abstract of Japanese Publication 59-191143.

Primary Examiner—Georgia Y. Epps
Assistant Examiner—Muhammad N. Edun
Attorney, Agent, or Firm—Sandler, Greenblum & Bernstein

[57] ABSTRACT

The optical disk apparatus of this invention is provided with a memory for memorizing a track offset signal corresponding to an angle of a galvanic mirror, or a photodetector having two pairs of photodetecting regions to detect different tracking error signals to each other, or two galvanic mirrors which are adjusted so as to prevent the track offset signal.

12 Claims, 17 Drawing Sheets

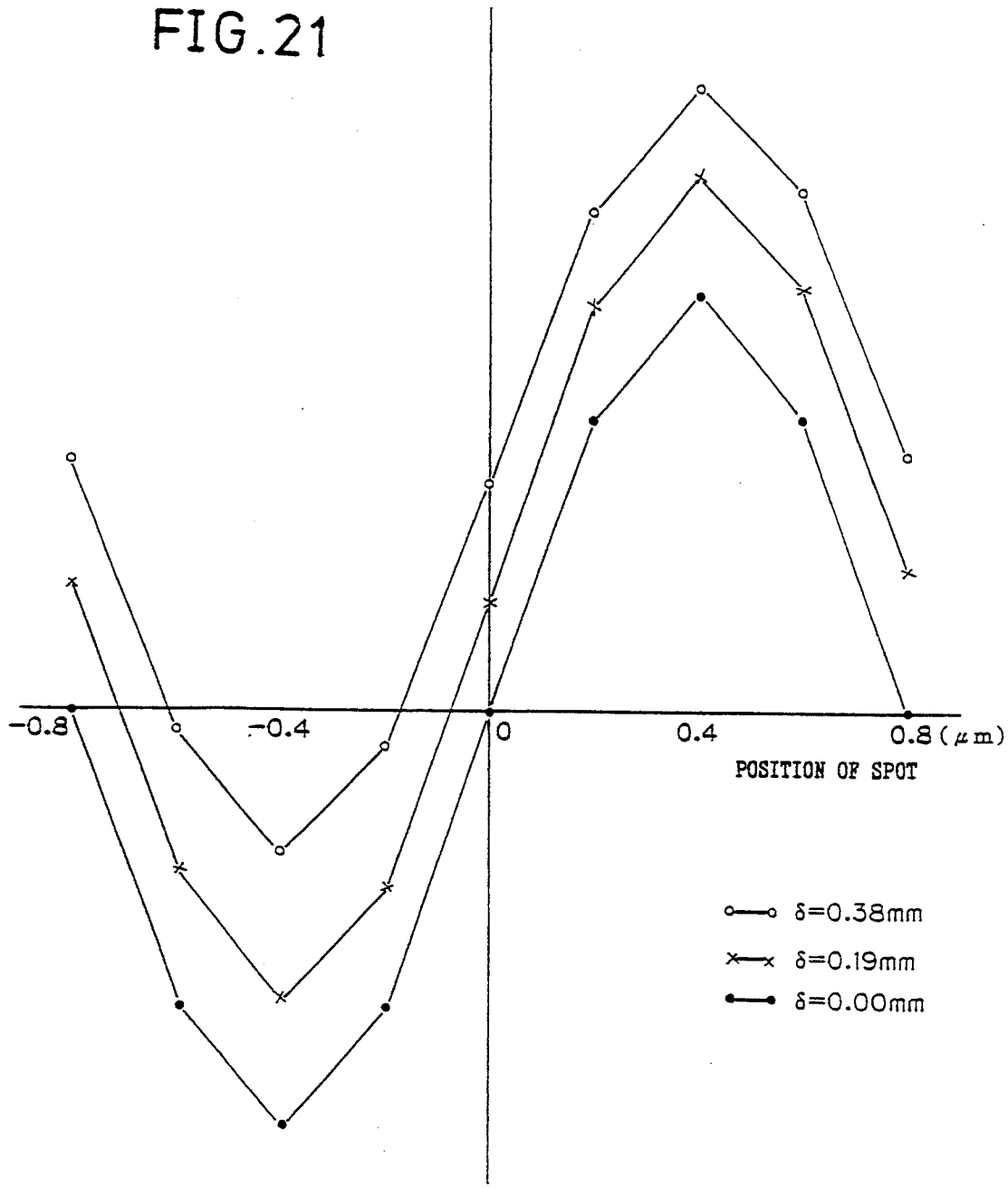

OPTICAL DISK APPARATUS

This application is a continuation of application Ser. No. 07/788,992, filed Nov. 7, 1991, now abandoned.

BACKGROUND OF THE INVENTION

1. Field of the Invention

This invention concerns an optical disk apparatus suitable for detecting tracking error signals by the push-pull method.

2. Description of the Prior Art

FIG. 18 shows a conventional optical disk apparatus. A light beam from a laser light source 1 advances via a collimator lens 2, a mirror 3 and an objective lens 4 so as to form a spot on an optical disk OD. Light reflected from the optical disk OD passes through a beam splitter 5 and a condensing lens 6 to a photodetector 7. The objective lens 4 and the mirror 8 are installed in a head 8 which is free to slide in the radial direction of the optical disk, all devices from the laser light source 1 to the beam splitter 5 being fixed.

The photodetector 7, as shown in FIG. 19, comprises two regions A, B divided by a boundary line corresponding to the tangential direction of the optical disk, the difference between the output from these two regions A, B giving a tracking error signal according to the push-pull method.

The distribution of reflected light condensed on the photodetector 7 varies due to diffraction produced by the positional relationship of the pits or grooves and the spot on the optical disk.

The mirror 3 is free to rotate in the direction of the arrow in the FIG. 18, and its angle is controlled by means of the tracking error such that the spot on the optical disk is in the center of a track.

In the aforesaid conventional optical disk apparatus, however, when the mirror 3 is inclined without moving the head 8 so that the spot is moved in a radial direction, the optical path of the reflected light beam is shifted by an amount $\delta$ compared to the case when the mirror is in its reference position as shown in FIG. 20. The entire spot on the photodetector is then displaced from the reference position shown by the solid line to the position shown by the broken line in FIG. 19, and the tracking error signal will contain an offset.

In this specification, a component of the tracking error signal caused by the shift $\delta$ of the reflected light is defined as a tracking offset signal.

FIG. 21 is a graph showing the relation between the position of the spot on a disk relative to a track and the tracking error signal. The horizontal axis the shift amount of the center of a spot from the center of a track and the vertical axis the tracking error signal. The ●—● line in the figure shows the tracking error signal when the shift $\delta$ of the reflected light is 0.00 mm, the ×—× line shows the tracking error signal when the shift $\delta$ of the reflected light is 0.19 mm and the ○—○ line shows the tracking error signal when the shift $\delta$ of the reflected light is 0.38 mm.

If the optical disk and the light beam are inclined relative to each other, the tracking error signal curve is shifted overall as the mirror inclination angle increases, and the actual shift amount and the signal do not correspond. Even if a servo controller based on the tracking error signal is used, therefore, the position of the spot cannot be accurately controlled.

SUMMARY OF THE INVENTION

This invention was conceived to overcome the above problems. It aims to provide an optical disk apparatus that can remove the track offset signal included in the tracking error signal or can detect an accurate tracking error signal without the tracking offset signal.

The optical disk apparatus of this invention is provided with a memory for memorizing a track offset signal corresponding to an angle of a galvanic mirror, or a photodetector having two pairs of photodetecting regions to detect different tracking error signals to each other, or two galvanic mirrors which are adjusted so as to prevent the track offset signal.

BRIEF DESCRIPTION OF THE DRAWINGS

FIG. 8 is a schematic diagram illustrating a part of an optical system of a modified embodiment of the embodiment 2.

FIG. 21 is a graph illustrating a tracking error signal of the conventional optical disk apparatus.

DETAILED DESCRIPTION OF THE EMBODIMENTS

The embodiment of the present invention will now be describe hereinafter with reference to the drawings. The present disclosure relates to subject matter contained in Japanese patent applications No. H2-303391 (filed on Nov. 7, 1990), No. H2-309762 (filed on Nov. 14, 1990) and No. H2-309763 (filed on Nov. 14, 1990) which are expressly incorporated herein by reference in their entireties.

Embodiment 1

Figure 1:
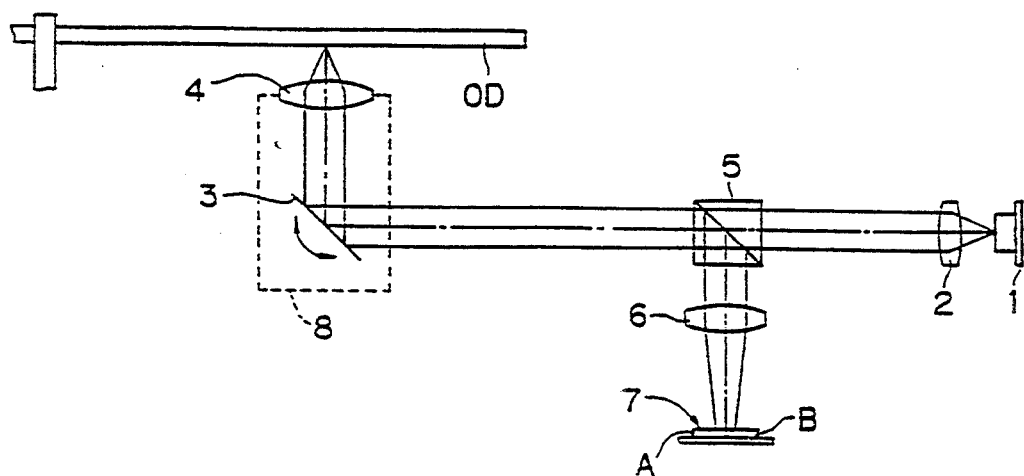
FIG. 1 is a schematic diagram illustrating an embodiment 1 of the optical disk apparatus according to this invention.

FIG. 1 illustrates a first embodiment of this invention. In embodiment 1, this invention is applied in a read only type optical disk apparatus.

As shown in FIG. 1, a light beam emitted by a laser light source 1 advances via a collimator lens 2, a mirror 3 and an objective lens 4 so as to form a spot on an optical disk OD. The light beam reflected from the optical disk OD passes through a beam splitter 5 and a condensing lens 6 to a photodetector 7.

The objective lens 4 and the mirror 3 are installed in a head 8 such that they are free to slide in the radial direction of the optical disk, all devices from the laser light source 1 to the beam splitter 5 being fixed.

Figure 2:
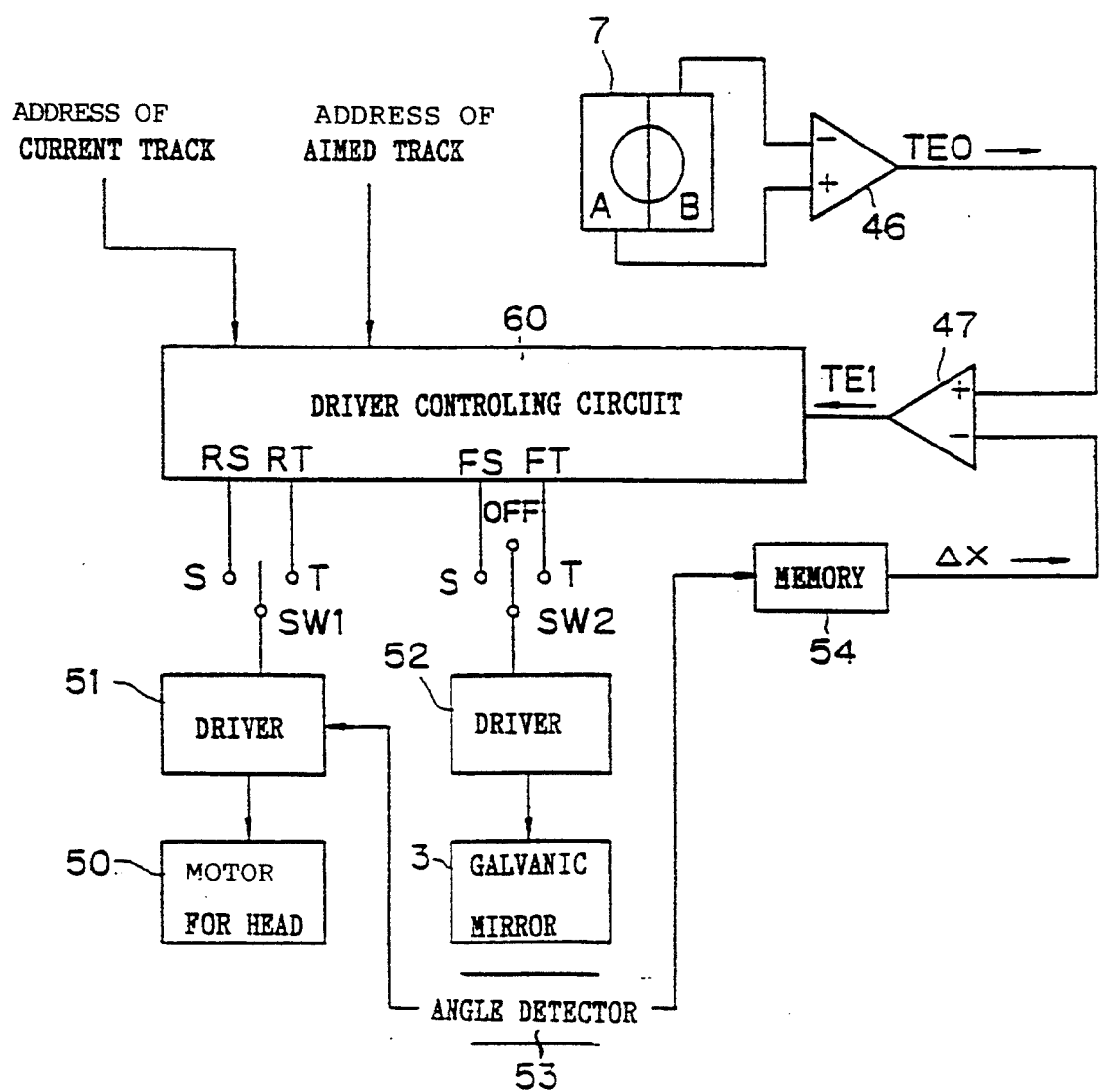
FIG. 2 is a schematic diagram illustrating the photodetecting regions on a photodetector and a signal processing circuit of the embodiment 1.

The photodetector 7 is provided to detect a tracking error signal. As shown in FIG. 2, its photodetecting region is divided into two regions A, B by a boundary line corresponding to the tangential direction of the optical disk. The original tracking error signal TE0 which contains the track offset signal is detected by subtracting outputs from the two regions A and B as follows.

$$TE0 = B - A$$

Next, a control system for driving the head and the galvanic mirror will be described with reference to FIG. 2. In the following description, a movement of the spot on the optical disk along a radial direction of the optical disk is defined as "seeking". The apparatus moves the head 8 for a coarse seeking and rotates the galvanic mirror for a fine seeking. Though the movement of the head 8 covers the whole region along the radius of the optical disk, a responsibility thereof is low. On the other hand, the seeking by the galvanic mirror has a higher responsibility than that of the head, the seeking range thereof, however, is scores of tracks. The apparatus divides the seeking into two steps that are the coarse seeking and the fine seeking.

The control system is provided with a motor 50 for moving the head and the galvanic mirror 3 as objects, drivers 51 and 52 for driving each object and a driver control circuit 60 for controlling the drivers. The rotation angle of the galvanic mirror 3 is detected by an angle detector 53. The signal of the detected angle is input into a memory 54 and the driver 51.

In the memory 54, a correction value $\Delta X$ for correcting the track offset signal is stored in connection with the rotation angle of the galvanic mirror 5, the memory 54 is accessed with the angle as an addressing signal and outputs the correction value $\Delta x$.

The outputs from the regions A and B of the photodetector 7 is subtracted by the subtractor 46 to obtain the original tracking error signal TE0. The subtractor 47 as a calculating means finds the tracking error signal TE1 by subtracting the correction value $\Delta X$, which is read from the memory, from the original tracking error signal TE0, and outputs the signal TE1 to the driver control circuit 60.

As shown in FIG. 21, the curve of the original tracking error signal TE0 shifts corresponding to the rotation angle of the galvanic mirror, that is, the amount of the movement of the spot on the disk by the fine seeking. Since, therefore, the amount of the shift is memorized in connection with the rotation angle of the galvanic mirror 3 and the correction value to cancel the shift is subtracted from the original tracking error signal TE0, the tracking error signal TE1 without the track offset signal can be obtained.

Moreover, the tracking error signal TE1 includes a low frequency component which is caused by, for example, a decentering of the optical disk and a high frequency component. The driver control circuit 60 outputs a low frequency signal RT for correcting the low frequency component and a high frequency signal FT for correcting the high frequency component based on the tracking error signal TE1.

The driver control circuit 60 calculates a coarse seeking signal RS and a fine seeking signal FS based on an address of the track that should be accessed and an address of a current track.

Either the coarse seeking signal RS or the low frequency tracking error signal RT is input into the driver 51 for driving the motor 50 which moves the head through a switch SW1. The driver 51 drives the motor 50 based on the coarse seeking signal RS when the switch SW1 connects to an S side. When the switch SW1 connects to a T side, the driver 51 drives the motor 50 based on the low frequency tracking error signal RT and an angle detected by the angle detector 53.

If the angle signal is input in the driver 51, the driver 51 moves the head 8 so that the movement of the head 8 replaces the movement of the spot due to the rotation of the galvanic mirror 3. In other words, the driver 51 moves the head 8 so that the tracking error signal which makes the galvanic mirror 3 return at a reference angle, which is obtained when the light beam impinge the optical disk at a right angle, is output. After the spot on the optical disk OD is moved by the fine seeking of the galvanic mirror 3, the head 8 is moved to follow the spot, and then the head arrives at the same position where the seeking is achieved by only the movement of the head 8.

On the other hand, either the fine seeking signal FS or the high frequency tracking error signal FT is input in the driver 52 through the switch SW2, the driver 52 drives the galvanic mirror 3 based on the either signals.

Next, an action for accessing an aimed track will be described.

Addresses of the aimed track and a current track are input in the driver control circuit 60, the circuit finds a moving amount of the head. The switch SW1 is connected to the S side, the switch SW2 is connected to an OFF position. The coarse seeking signal RS is output from the driver control circuit 60 to the driver 51, the driver 51 drives the motor 50 based on the signal RS without feedback process. During the movement of the head, the galvanic mirror 3 is fixed at the reference angle thereof.

After the coarse seeking finishes, the switch SW1 is changed over to the T side and the switch SW2 is changed over to the S side. The driver controlling circuit finds the difference between the address of a current track and the aimed track, the fine seeking signal FS is output to the driver 52. The driver 52 rotates the galvanic mirror 3 so that the spot on the optical disk moves to the aimed track one track each. During the movement, the correction value ΔX is output from the memory 54 corresponding to the angle signal from the angle detector 53.

When the spot on the optical disk arrives the aimed track, the switch SW2 is changed over to the T side and the galvanic mirror 3 is driven based on the tracking error signal TE1.

If the driver 51 gives the output from the angle detector 53 priority over the low frequency tracking error signal RT to move the head, the low frequency component, which is usually corrected by the movement of the head, is mixed with the high frequency tracking error signal FT. This is the low frequency component for returning the galvanic mirror 3 at the reference angle. Since the driver 52 rotates the galvanic mirror 3 based on the signal FT including this low frequency component, the angle of the galvanic mirror 3 returns to the reference angle by degrees. The correction value ΔX output from the memory 54 varies corresponding to the rotation angle of the galvanic mirror 3, the value becomes zero when the galvanic mirror 3 returns to the reference angle.

Embodiment 2

Figure 3:
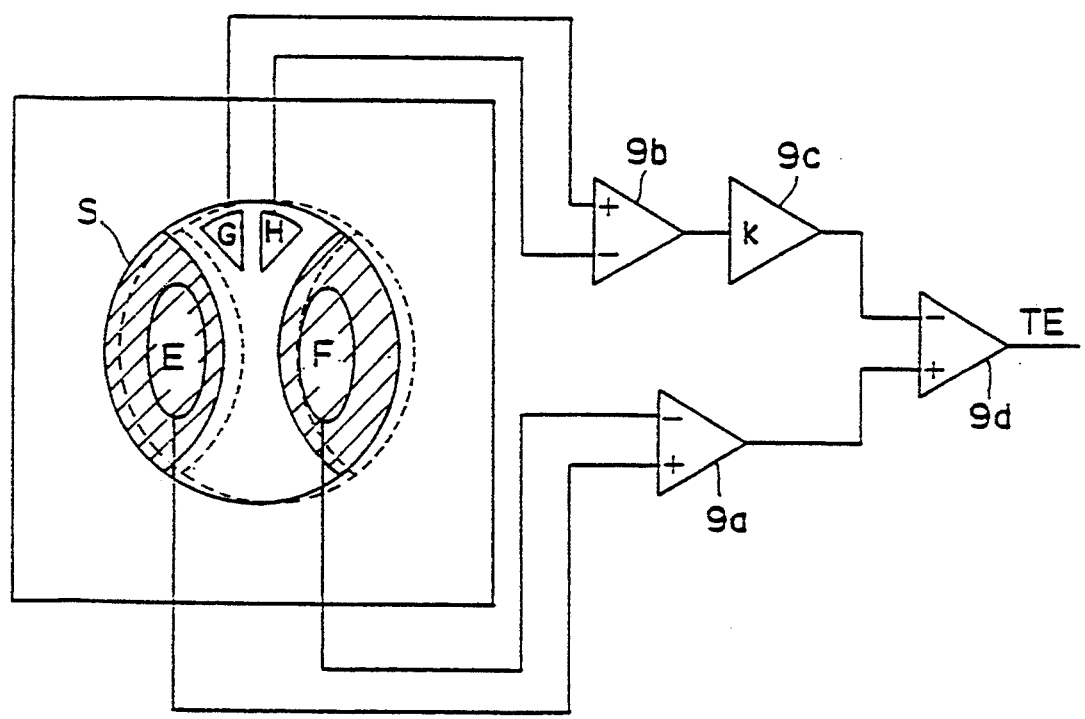
Figure 4:
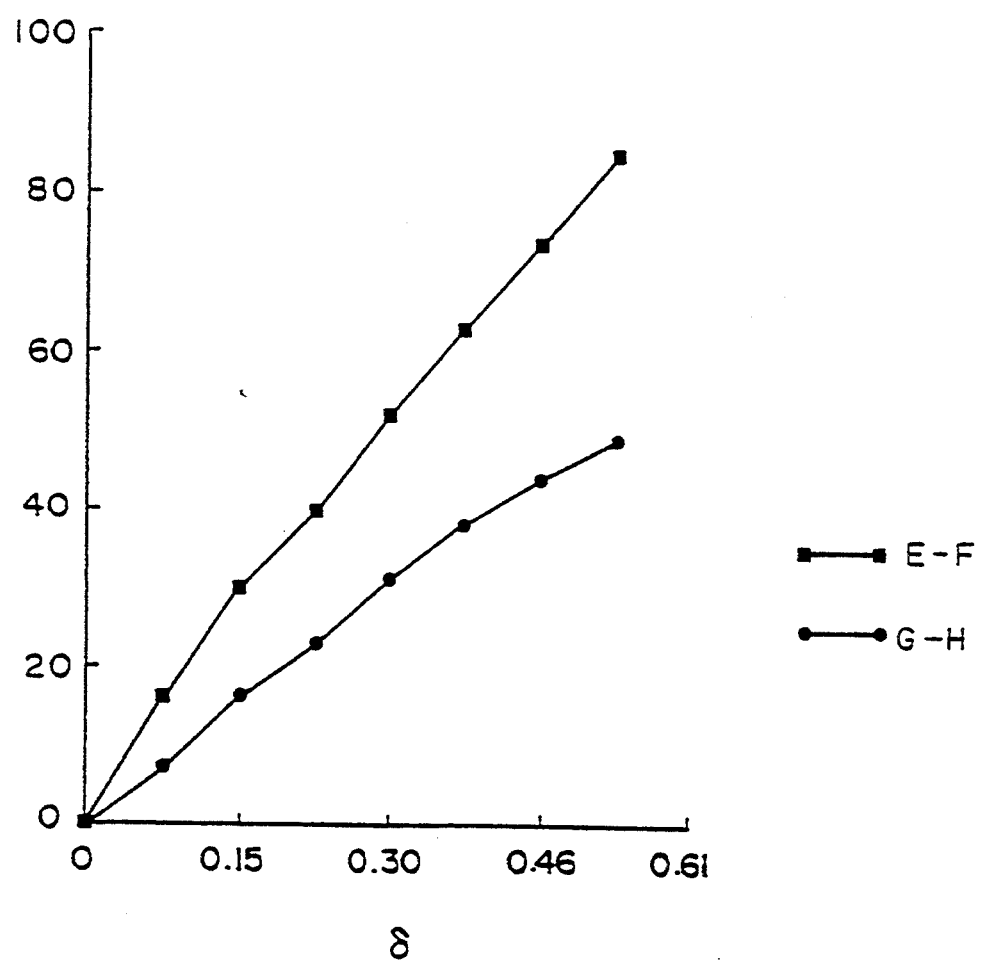
FIG. 4 is a graph showing a subtracting signal of the first photodetecting regions and the same of the second photodetecting regions.
Figure 5:
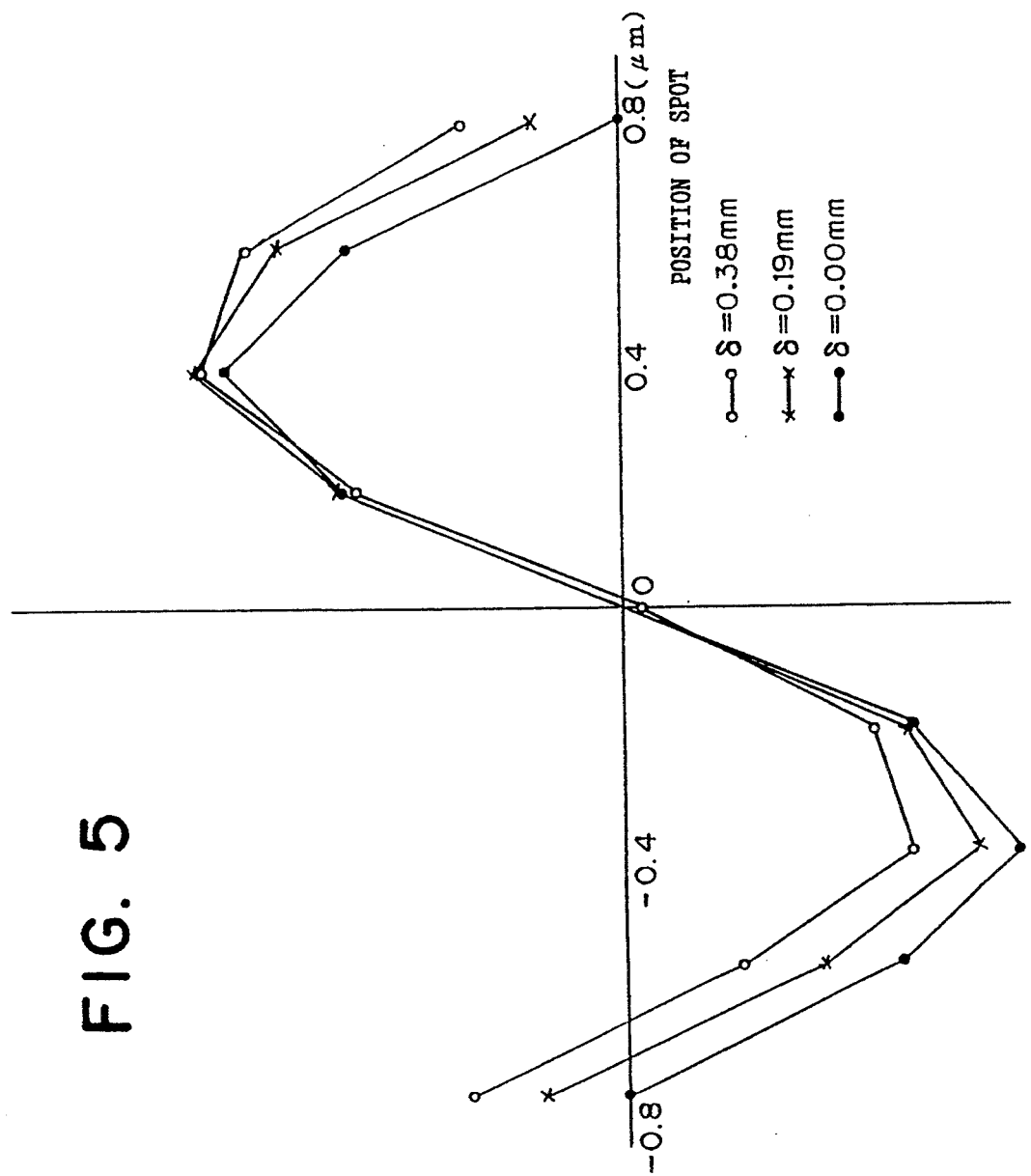
FIG. 5 is a graph of a tracking error signal of the apparatus of the embodiment 2.

FIGS. 3 to 5 show an embodiment 2 of the present invention. In the embodiment 2, an arrangement of the optical element is the same as the embodiment 1 except a pattern of the photodetecting region of the photodetector.

The photodetector 7 is provided with first and second photodetecting portions as shown in FIG. 3. Each portion is divided into two regions by a boundary line corresponding to the tangential direction of the optical disk.

The first photodetecting portion has regions E and F which mainly receive one order diffraction light shown by hatching in the figure. By subtracting the outputs from these regions, the tracking error signal including the track offset signal is detected. The second photodetecting portion has regions G and H which mainly receive zero order diffraction light, and the track offset signal is mainly detected by subtracting outputs of these regions.

When the galvanic mirror 3 is rotated, a spot on the photodetector, for example, moves to position illustrated by a broken line in the figure. If the spot on the photodetector 7 is moved as mentioned above, the regions G and H of the second photodetecting portion do not receive the one order diffraction light and the output signal of the second photodetecting portion is hardly affected by the tracking error.

Figure 20:
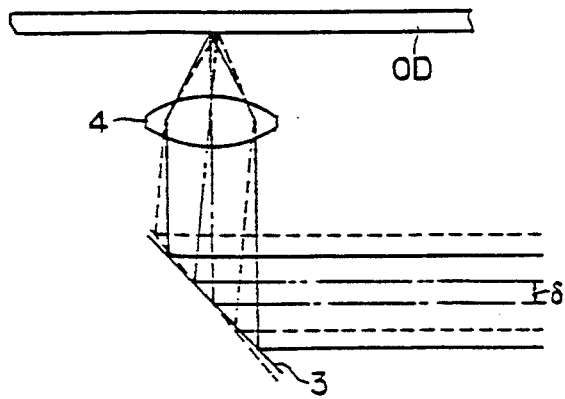
FIG. 20 is a schematic diagram illustrating the shift of reflected light when a light beam is inclined.
Figure 19:
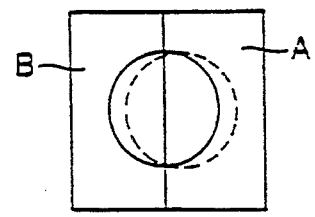
FIG. 19 is a schematic diagram illustrating the motion of a spot on the photodetector.

FIG. 4 is a graph showing the relation between the shift δ of the reflected light (see FIG. 20) and the subtracting signals of the first and second photodetecting portions. The horizontal axis represents the shift amount of the center of a spot from the center of a track, and the vertical axis represents a level of the signal. The ■ — ■ line in the figure shows the subtracting signal (E−F) and the ● — ● line shows the subtracting signal (G−H). These subtracting signals are detected when a spot on the optical disk coincides with the center of a track, that is, the signals are corresponding to only the track offset signal.

It can be understood that an increasing ratio of the signal of the second photodetecting portion is smaller than that of the first photodetecting portion. Since the influence of the movement of the spot on the photodetector appears on each subtracting signal in different ratio, the track offset signal can be removed from the original tracking error signal by calculating the subtracting signals using a suitable coefficient.

The tracking error signal TE is detected by calculating outputs from the four regions E, F, G and H as follows.

$$TE = (E-F) - K(G-H)$$

Wherein K is a coefficient to balance the both subtracting signals. As shown in FIG. 3, the comparator $9d$ subtracts the signal from the amplifier $9c$ which amplifies the subtracting signal output from the comparator $9b$ from the subtracting signal output from the comparator $9a$.

As a result of the above-mentioned calculation, the detected tracking error signal does not shift even when the galvanic mirror 3 rotates as shown in FIG. 5. The tracking error signal is accurately detected even when a spot on an optical disk moves to a track except a reference track.

In the aforesaid description, only the case has been described wherein a photodetector is provided to detect the tracking error signal, but it is well known in the art that in an actual apparatus, a photodetector to reproduce a recording signal and a photodetector to detect a focusing error signal may also be provided.

Figure 6:
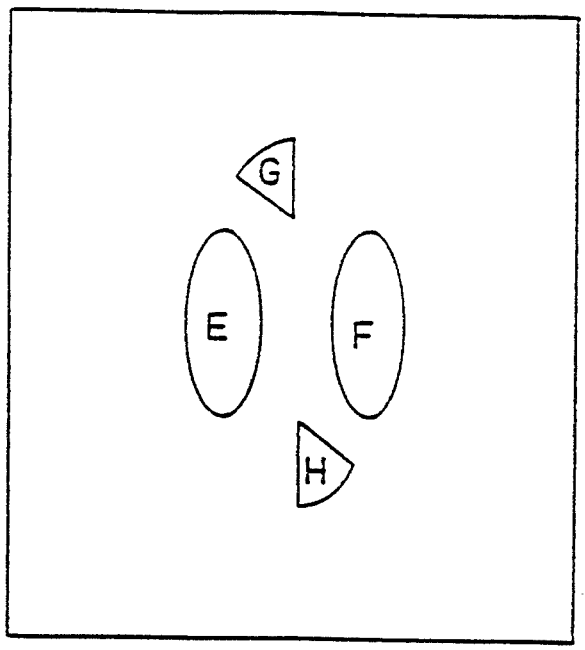
FIG. 6 is a schematic diagram illustrating a photodetector of a modified embodiment of the embodiment 2.
Figure 7:
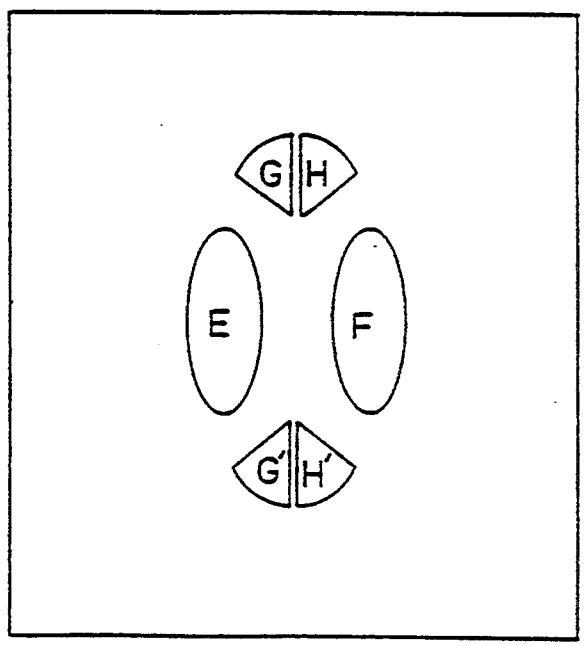
FIG. 7 is a schematic diagram illustrating a photodetector of the other modified embodiment of the embodiment 2.

FIGS. 6 and 7 show photodetectors of modified embodiments of the embodiment 2. In these embodiments, the first photodetecting regions E and F are the same as the embodiment 2 shown in FIG. 3 and the arrangement of the second photodetecting regions is different from that of the embodiment 2.

In the case of FIG. 6, the second photodetecting regions are separately located in the radial direction. The tracking error signal can be detect by the same calculation as that of FIG. 3. The variation of the light distribution due to a tracking error is asymmetrical only in the radial direction, and it is symmetrical in the tangential direction. The tracking error signal can be detected by the photodetector of FIG. 6 in the same way as that of FIG. 3.

In the case of FIG. 7, two pairs of the second photodetecting regions are disposed, the tracking error signal TE is obtained by the following equation.

$$TE = (E-F) - K\{(G+G') - (H+H')\}$$

When the light beam does not have a wave front aberration, the variation of the light distribution due to a tracking error is symmetrical in the tangential direction as mentioned above. If the light beam has a wave front aberration, the variation of the light distribution may be also asymmetrical in the tangential direction.

Since the photodetector of FIG. 7 detects the amount of light at both sides in the tangential direction, it can prevent a variation of the output from the second photodetecting portion due to the asymmetry even if the distribution of light quantity in the tangential direction is asymmetrical.

Figure 8:
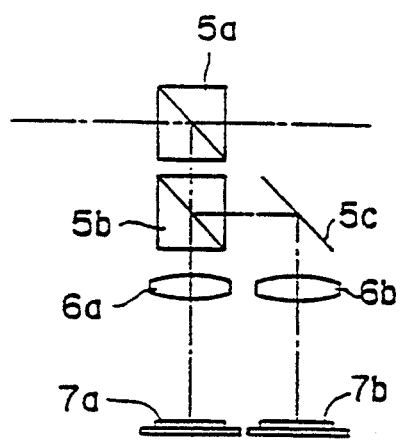
FIG. 8 is a schematic diagram illustrating the photodetecting regions on a photodetector and a signal processing circuit of an embodiment 2.
Figure 9A:
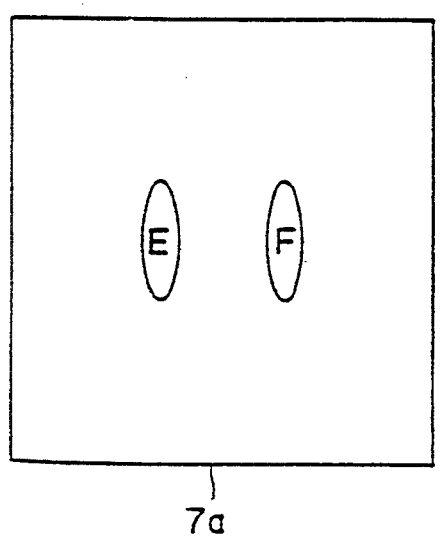
FIGS. 9(A) and 9(B) are schematic diagrams illustrating a photodetecting regions of the photodetector shown in FIG. 8.
Figure 9B:
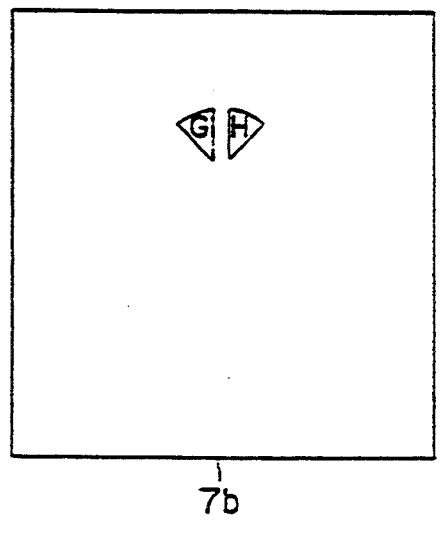

FIGS. 8 and 9 shows a modified embodiment of the embodiment 2. In this embodiment, the first photodetecting portion and the second photodetecting portion are disposed on different photodetectors.

Part of the reflected light from the optical disk is reflected by a first beam splitter 5a and further separated into two components by a second beam splitter 5b. The light transmitted through the second beam splitter 5b condenses on a first photodetector 7a through a condenser lens 6a. And also, the light reflected by the second beam splitter 5b is reflected by a mirror 5c and condenses on a second photodetector 7b.

Each of the first and second photodetectors 7a and 7b is provided with, as shown in FIG. 9, two regions E, F, G and H divided by a boundary line corresponding to the tangential direction of the optical disk.

The tracking error signal TE can be found by the following equation in the same way as the above-mentioned example.

$$TE=(E-F)-K(G-H)$$

Embodiment 3

Figure 10:
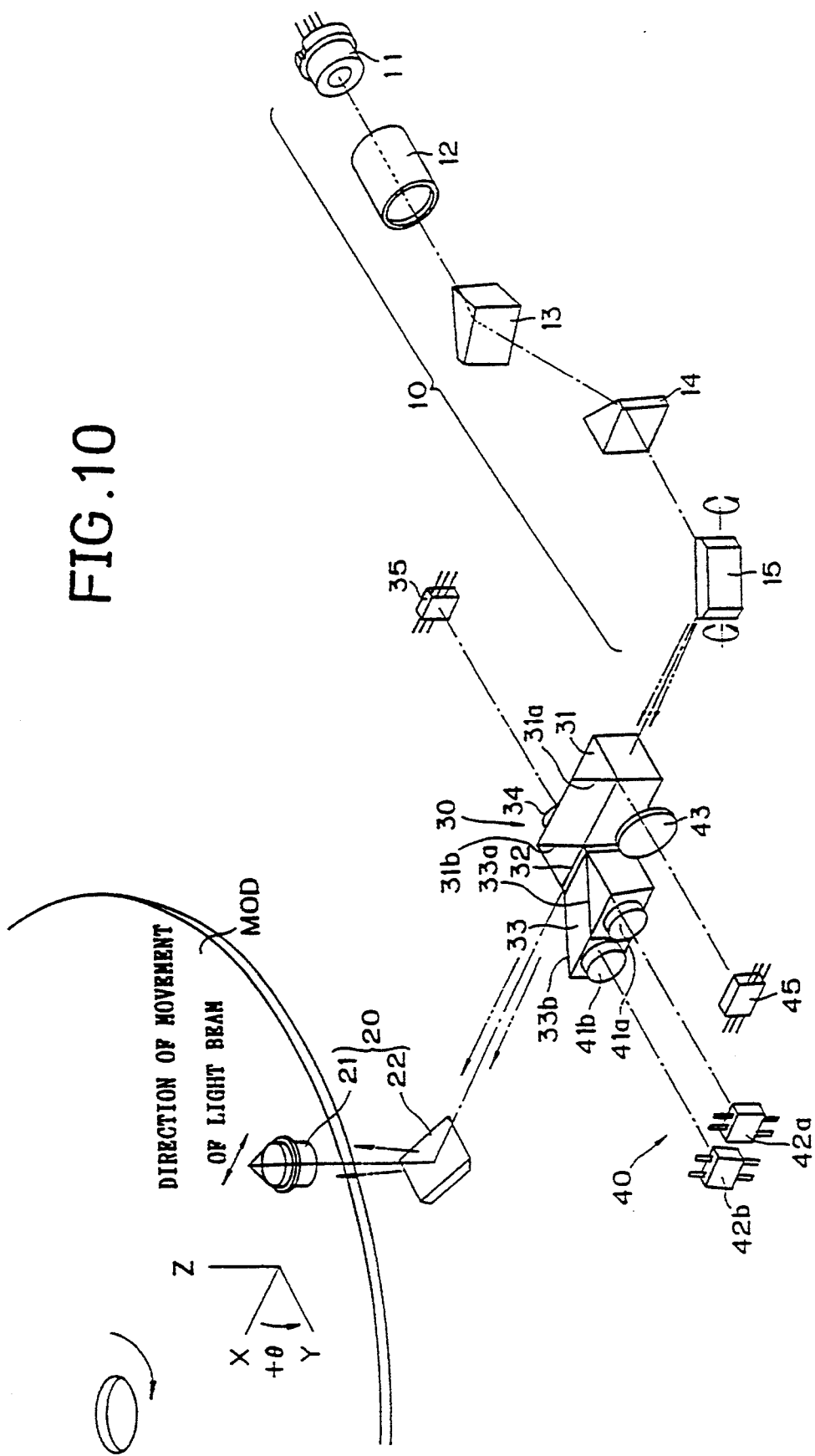
FIG. 10 is a schematic diagram illustrating an embodiment 3 of the optical disk apparatus according to this invention.
Figure 11:
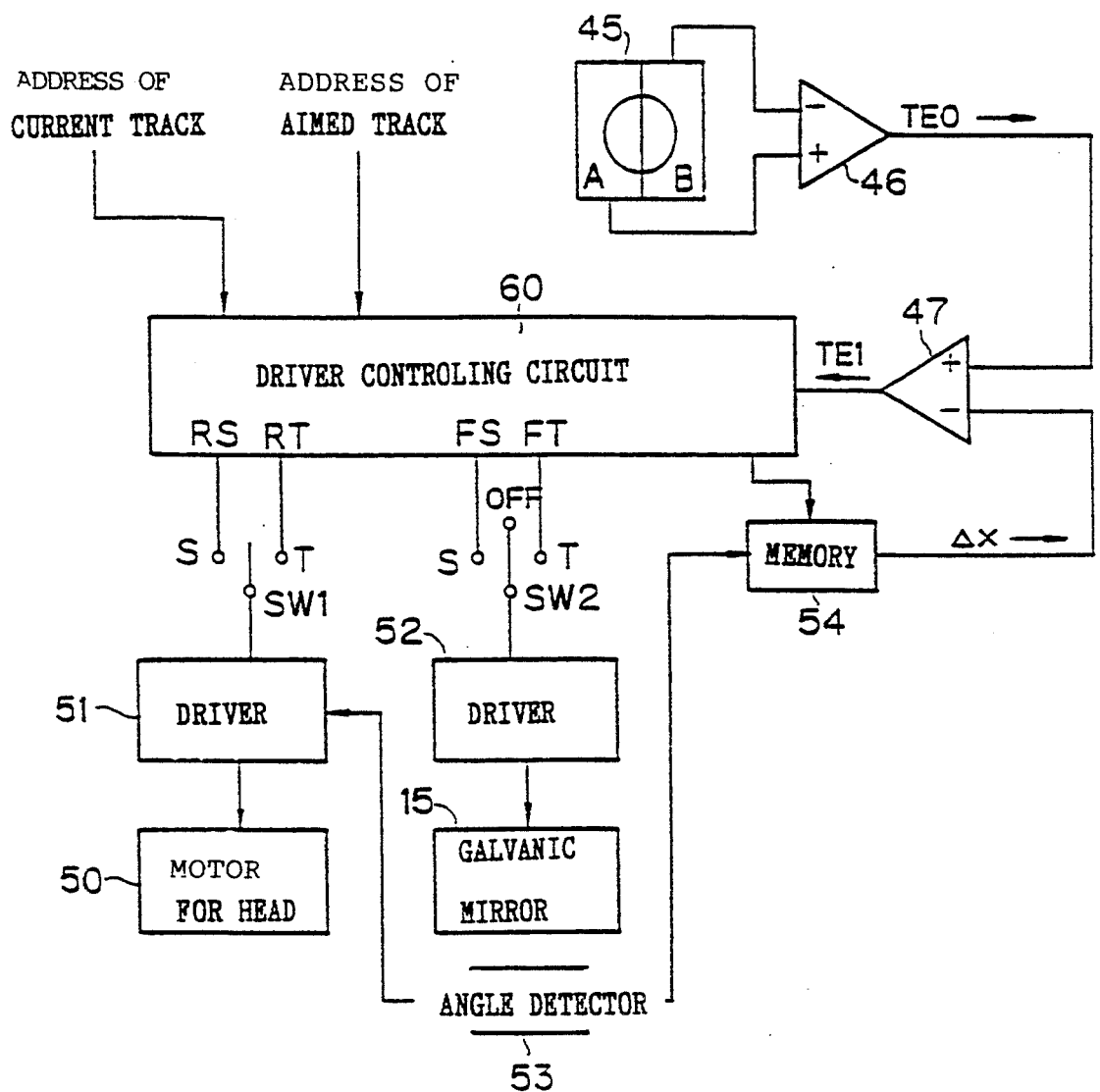
FIG. 11 is a schematic diagram illustrating the photodetecting regions on a photodetector and a signal processing circuit of the embodiment 3.

FIGS. 10 and 11 illustrate an embodiment 3 wherein this invention is applied to an information recording and reproduction apparatus using an magneto-optic disk.

The overall construction of the optical system will first be described.

In this optical system, as shown in FIG. 10, there are provided an light source unit 10, an objective optical system 20, a prism block 30 and a signal detecting optical system 40. The light source unit 10 comprises a semiconductor laser 11 generating a divergent light beam, a collimator lens 12 for converting the divergent light beam to a parallel light beam, two anamorphic prisms 13, 14 for shaping the sectional shape of the light beam, and a galvanic mirror 15. This light source unit 10 generates a parallel beam of circular cross-section. The galvanic mirror 15 is free to rotate so as to displace the spot on the optical disk in the radial direction.

The objective optical system 20 comprises an objective lens 21 which converges a light beam on the signal recording surface of an magneto-optic disk MOD and a mirror 22. The objective lens 21 and mirror 22 are installed in a head, not shown, which is free to slide in the radial direction of the magneto-optic disk MOD. On the other hand, the light source unit 10, the prism block 30 and the signal detecting optical system 40 are fixed. Further, the objective lens 21 is installed on an actuator in a head so that it can be driven in the direction z of the optic axis.

The prism block 30 comprises a first block 31 having two half mirror surfaces 31a, 31b, and a second block 33 having a polarizing separating surface 33a and a full reflecting surface 33b joined to the first block via a half wavelength plate 32.

The light beam from the light source unit 10 is partly reflected by the second half mirror surface 31b, and is condensed by a condensing lens 34 on a photodetector 35 for automatic regulation of the output of the semiconductor laser.

Part of the light beam reflected by the magneto-optic disk MOD is also reflected by the second half mirror surface 31b, and its polarization direction is rotated by 45° by the half wavelength plate 32. A P component passes through a polarization splitting surface 33a, and then via a condensing lens 41a to be condensed on a first photodetector 42a for detecting a magnetically recorded signal. An S component, on the other hand, is reflected by the polarization splitting surface 33a and the full reflecting surface 33b, and passes via a condensing lens 41b to be condensed on a second photodetector 42b for detecting a magnetically recorded signal.

As the polarization direction of the laser beam incident on the magneto-optic disk MOD is rotated by a magnetic Kerr effect corresponding to the magnetization direction of the optical disk at the position where the spot forms an image, the recorded signal can be read by rotating the laser beam by 45° as described above, splitting it into two components P, S, and detecting these components by means of the separate photodetectors 42a, 42b so as to determine the intensity difference between them.

A component of the reflected light from the magneto-optic disk MOD that is passes through the second half mirror 31b is reflected by the first half mirror 31a, and condensed on the photodetector 45 for detecting the tracking error signal via a condenser lens 43. In this description, a photodetector for detecting a focusing error signal is not shown.

According to this embodiment, in order to make the head more lightweight so as to speed up access, the objective lens, mirror and an actuator that focuses by driving this objective lens in the direction z of the optic axis are installed in a head, and the spot is moved in the radial direction by a galvanic mirror 15 installed in the fixed part of the apparatus.

In this arrangement, however, the distance between the mirror and the optical disk is greater than the apparatus of Embodiment 1, and if the mirror is inclined so as to shift the spot on the optical disk in the radial direction, the spot on the photodetector is displaced more than in the apparatus of Embodiment 1. The elimination of offset is therefore more important than in the apparatus of embodiments 1 and 2.

FIG. 11 is a block diagram showing a controlling system of the embodiment 3. This system is similar to the system of the embodiment 1 shown in FIG. 2, it is provided with a motor 50, drivers 51 and 52 for driving each object and a driver control circuit 60 in which addresses of a current track and an aimed track are input. The signal of the detected angle of the galvanic mirror and the address of the current track are input into a memory 54 which outputs a correction value Δx to a subtractor 47.

In the apparatus of the embodiment 3, an optical length from the galvanic mirror 15 to the photodetector varies corresponding to the position of the head, that is, by whether the head is positioned at an inner part of the disk or an outer part thereof. The relation between the angle of the galvanic mirror 3 and the correction value Δx is different every track. The correction value Δx for each track are stored in the memory 54 and the rotation angle and the address of the current track are input into the memory 54 in order to read the value.

As a result of the construction, though the track offset can be perfectly corrected, the capacity of the memory becomes enormous.

In order to lessen the capacity, it is possible to divide the whole tracks into several regions and to store the correction value for each region.

And also, when the variation of the optical path has almost no influence on the track offset, it is able to use the correction value for a middle track located at the center between an outermost track and innermost track.

An action for accessing an aimed track is the same as the embodiment 1.

Embodiment 4

Figure 12:
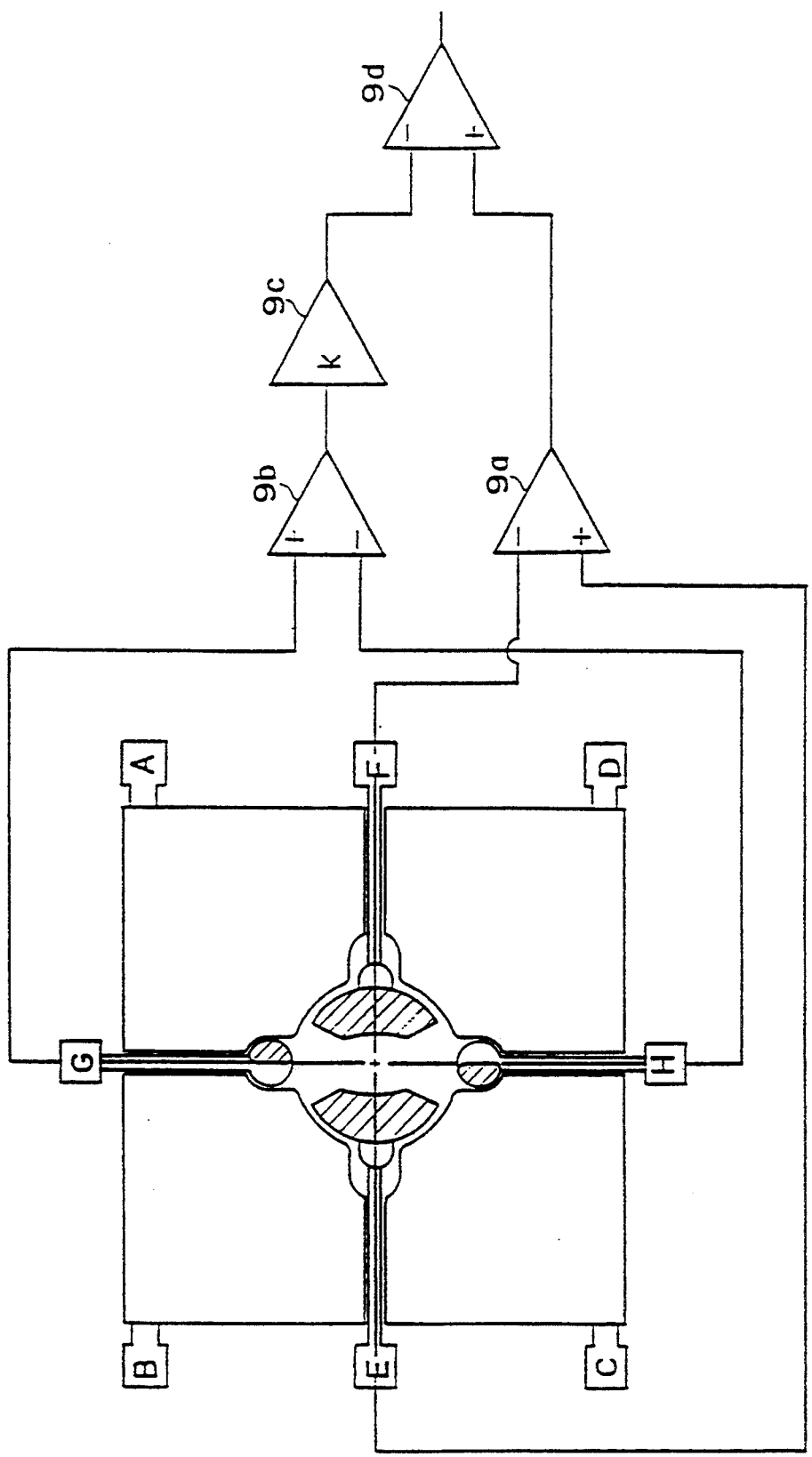
FIG. 12 is a schematic diagram illustrating the photodetecting regions on a photodetector and a signal processing circuit of an embodiment 4.

FIG. 12 shows an embodiment 4 of the present invention.

The optical system is the same as the embodiment 3 shown in FIG. 10 except a pattern of the photodetecting region of the photodetector.

The photodetector 45 for detecting the error signals is provided with a first photodetecting regions E and F, a second photodetecting regions G and H and a third photodetecting regions A, B, C and D as shown in FIG. 12.

The tracking error signal is detected with comparators 9a, 9b and 9d and an amplifier 9c according to the following equation. The principle of the detection is the same as the embodiment 2 shown in FIG. 3.

$$TE=(E-F)-K(G-H)$$

The first galvanic mirror 15 is controlled so that the center of the spot on the optical disk is coincide with the center of the track based on the detected tracking error signal.

In the embodiment 4, a focusing error signal FE can be obtained by calculating outputs from the third photodetecting regions A, B, C and D according to the following equation.

$$FE=(A+C)-(B+D)$$

A focus actuator, not shown, drives the objective lens 21 along the optical axis direction so that the focusing error signal FE becomes zero.

Embodiment 5

FIGS. 13 to 16 show an embodiment 5 of the present invention.

Figure 13:
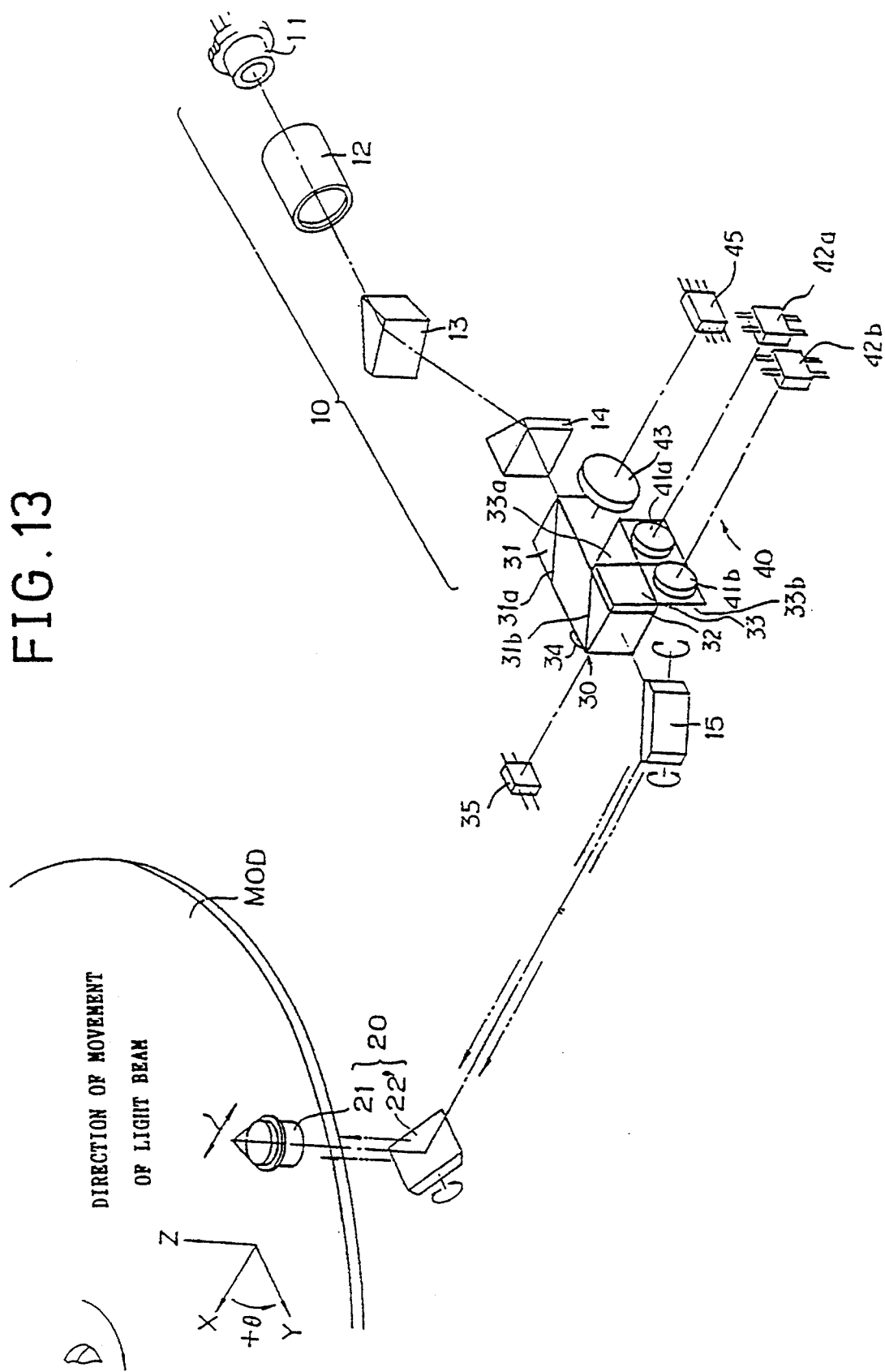
FIG. 13 is a schematic diagram illustrating an embodiment 5 of the optical disk apparatus according to this invention.

The optical system is shown in FIG. 13 that is almost the same as the embodiment 3 shown in FIG. 10. In the embodiment 5, the prism block 30 and the signal detecting optical system 40 are disposed between the prism 14 and a first galvanic mirror 15, a second galvanic mirror 22' is installed in the head. These two galvanic mirrors 15 and 22' are rotated for correcting the tracking error and for the track jump, the angles of the mirrors are adjusted so as to prevent a movement of the spot on the photodetector 45.

Figure 14:
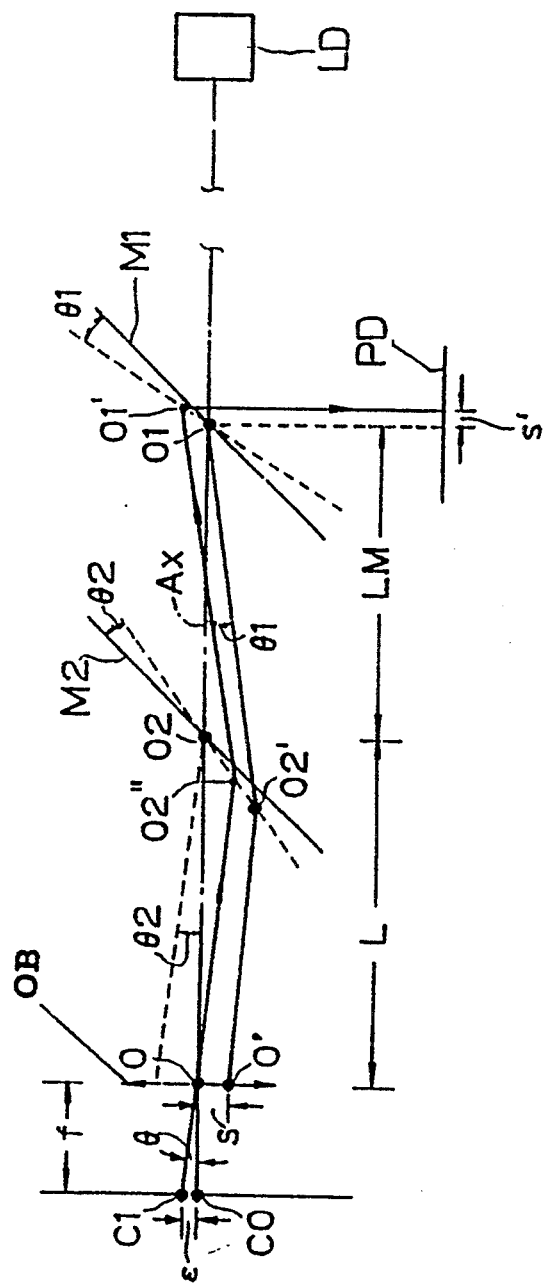
FIG. 14 is a schematic diagram illustrating relation between angles of two galvanic mirrors of an embodiment 5.

FIG. 14 shows the relation between the angles of the first and second galvanic mirrors M1 and M2 and the change of the central axis of the reflected light beam. The laser beam that impinges on the objective lens OB has a larger diameter than that of the objective lens in order to prevent the light beam from being off the pupil of the objective lens OB when the galvanic mirrors rotate. The diameter of the reflected light beam from magneto-optic disk MOD, therefore, is determined by the diameter of the pupil of the objective lens, and the central axis of the reflected light beam is indicated by the straight line passing through the center O of the objective lens OB.

When the first and second galvanic mirrors M1 and M2 are positioned in the reference position shown by the solid line, the central axis of the laser beam emitted from the semiconductor laser LD coincides with the optical axis Ax of the objective lens OB, the spot is formed at the point CO on the magneto-optic disk MOD. The reflected light from the magneto-optic disk MOD advances along the same optical path when the light beam is incident, and is reflected by the first galvanic mirror M1 to the photodetector PD.

If the first galvanic mirror M1 pivots in a counterclockwise direction by $\theta 1$ and the second galvanic mirror M2 pivots in clockwise direction by $\theta 2$ as shown by the broken line, the laser beam emitted from the semiconductor laser LD make an angle of $\theta$ against the optical axis Ax and the reflected beam from the magneto-optic disk MOD arrives at the photodetector PD. However, the central axis of the reflected beam passing through the center O of the objective lens intersects the mirror M2 at the point O2″ and the mirror M1 at the point O1′, the center of the spot on the photodetector PD displaces from said reference position by s′.

If a moving amount of the spot on the magneto-optic disk MOD is $\epsilon$, an angle between the optical axis Ax and an emerged beam from the objective lens OB is $\theta$, a distance between the objective lens OB and the second galvanic mirror M2 is L, a distance between the first and the second galvanic mirrors M1 and M2 is LM, a focal length of the objective lens OB is f, the following equations can be obtained;

$$\epsilon/f=\theta$$

$$\theta=\theta 1+\theta 2$$

$$s=(LM+L)\theta 1+LM\cdot\theta 2$$

If the central axis of the reflected light passes through the rotation center of the first galvanic mirror M1, the shift s′ of the spot on the photodetector becomes zero. Since the galvanic mirrors pivot so that the following equations are satisfied, the distance s between the points O and O′ becomes zero and the shift s′ of the central axis on the photodetector becomes zero.

$$\theta 1= -(L/LM)(\epsilon/f) \qquad (1)$$

$$\theta 2=(\epsilon/f)(1+(L/LM))=(\epsilon/f)-\theta 1 \qquad (2)$$

Figure 15:
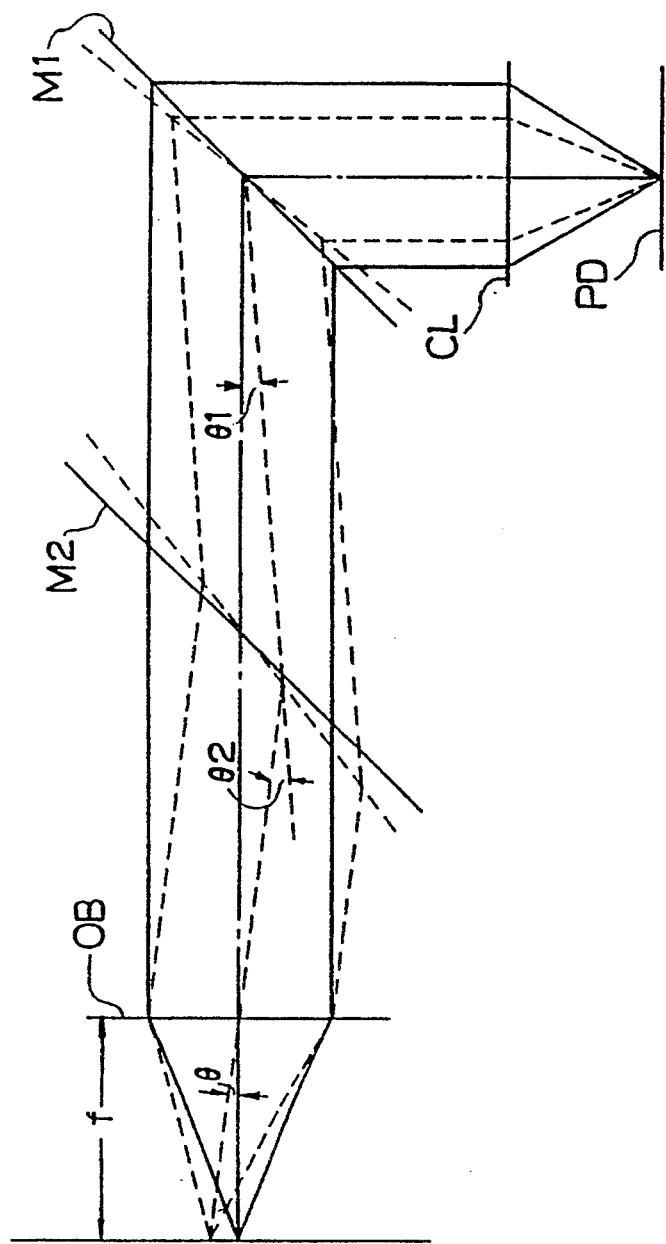
FIG. 15 is a schematic diagram illustrating relation between the angles of the galvanic mirrors and a shift of a light beam of the embodiment 5.

FIG. 15 shows optical paths before and after the galvanic mirrors M1 and M2 pivot to move a spot on the magneto-optic disk MOD so that the above-mentioned two equations are satisfied. A reference character CL denotes a condenser lens. In the figure, the solid line shows the optical path before the rotation, the broken line shows that after the rotation. It can be understood that the spot on the photodetector PD does not move even if the galvanic mirrors pivot when the two equation is satisfied.

In FIGS. 14 and 15, the reflected light beam is drawn in such a manner as to reflected by the mirror M1 and impinge on the photodetector PD in order to be understood easily. The figures do not show the actual construction.

Figure 16:
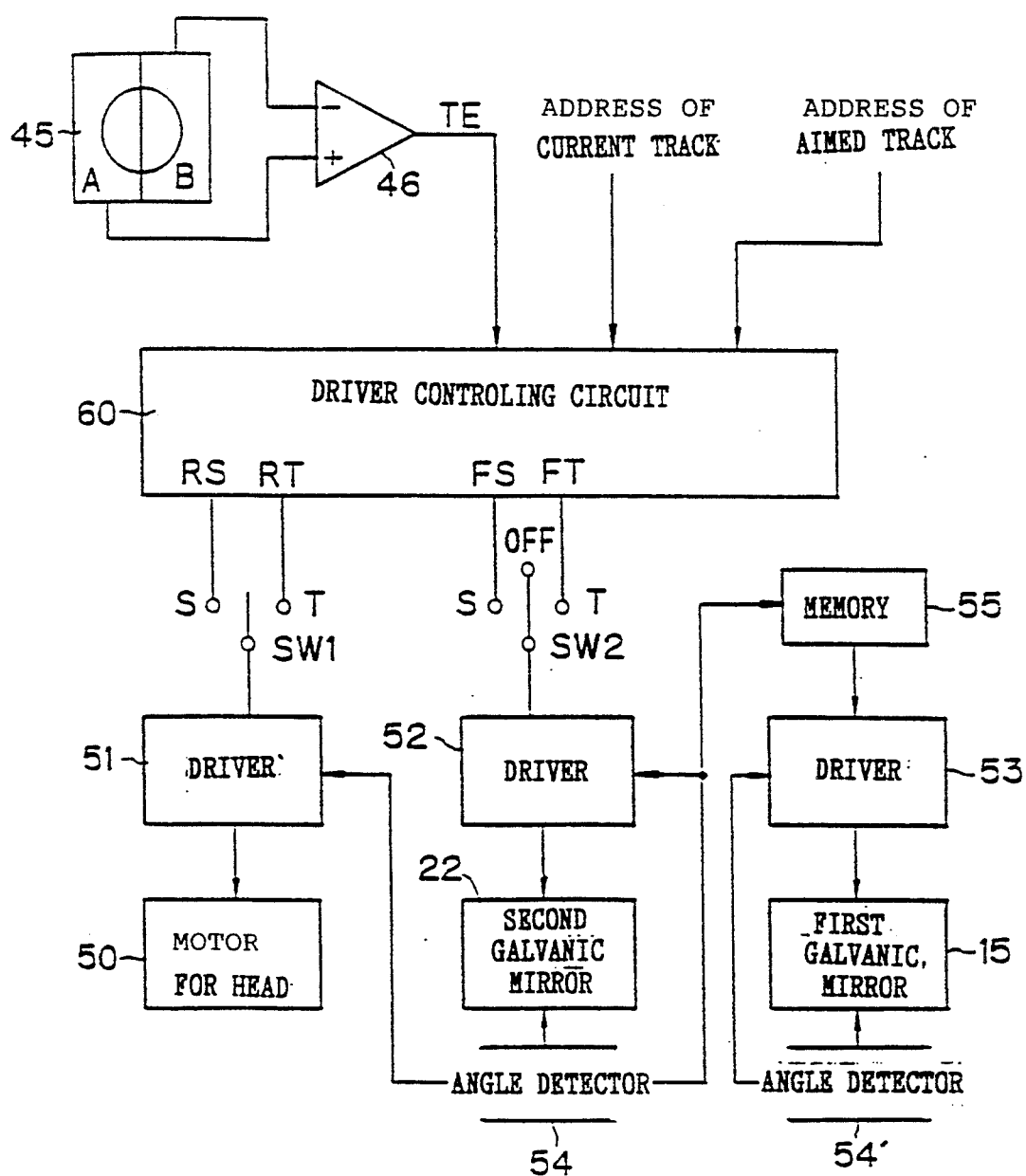
FIG. 16 is a schematic diagram illustrating a photodetecting regions of the photodetector of the embodiment 5.

The controlling system, which is the same as the embodiment 3 (FIG. 11), is shown in FIG. 16. It is provided with the motor 50, the first and second galvanic mirrors 15 and 22', the drivers 51, 52 and 53, the angle detectors 54 and 54' and the driver controlling circuit 60. Each of the drivers drives the galvanic mirror based on the input signal from the diver controlling circuit 60 monitoring the detected angle with feedback process.

The memory 55 connected with the driver 53 outputs the angle of the first galvanic mirror 15 so that the angles θ1 and θ2 satisfy the equations (1) and (2) based on the detected angle of the second galvanic mirror 22'. The driver 53 drives the first galvanic mirror 15 based on the output angle from the memory 55. As a result of the action, the spot position on the photodetector 45 can be corrected.

An action for accessing an aimed track is the same way as the embodiment 1.

The driver 52 rotates the second galvanic mirror 22' so that the spot on the optical disk moves to the aimed track every one track. During the movement, the driver 53 drives the first galbanic mirror 15 so that the spot on the photodetector 45 does not move from the center based on the output from the memory 55 corresponding to the angle signal from the angle detector 54.

Since the rotation angles of the galvanic mirrors are determined according to the above-mentioned equations (1) and (2), the occurrence of the track offset can be prevented.

Since the driver 52 rotates the second galvanic mirror 22' based on the signal FT including this low frequency component, the angle of the second galvanic mirror 22' returns to the reference angle by degrees. And also, since the angle of the first galvanic mirror is determined according to the angle of the second galvanic mirror, the first galvanic mirror returns to the reference angle when the second galvanic mirror returns to the reference angle.

Since the angles of two galvanic mirrors are adjusted, the spot on the photodetector does not move even if the galvanic mirror pivots during the fine seeking.

Embodiment 6

Figure 17:
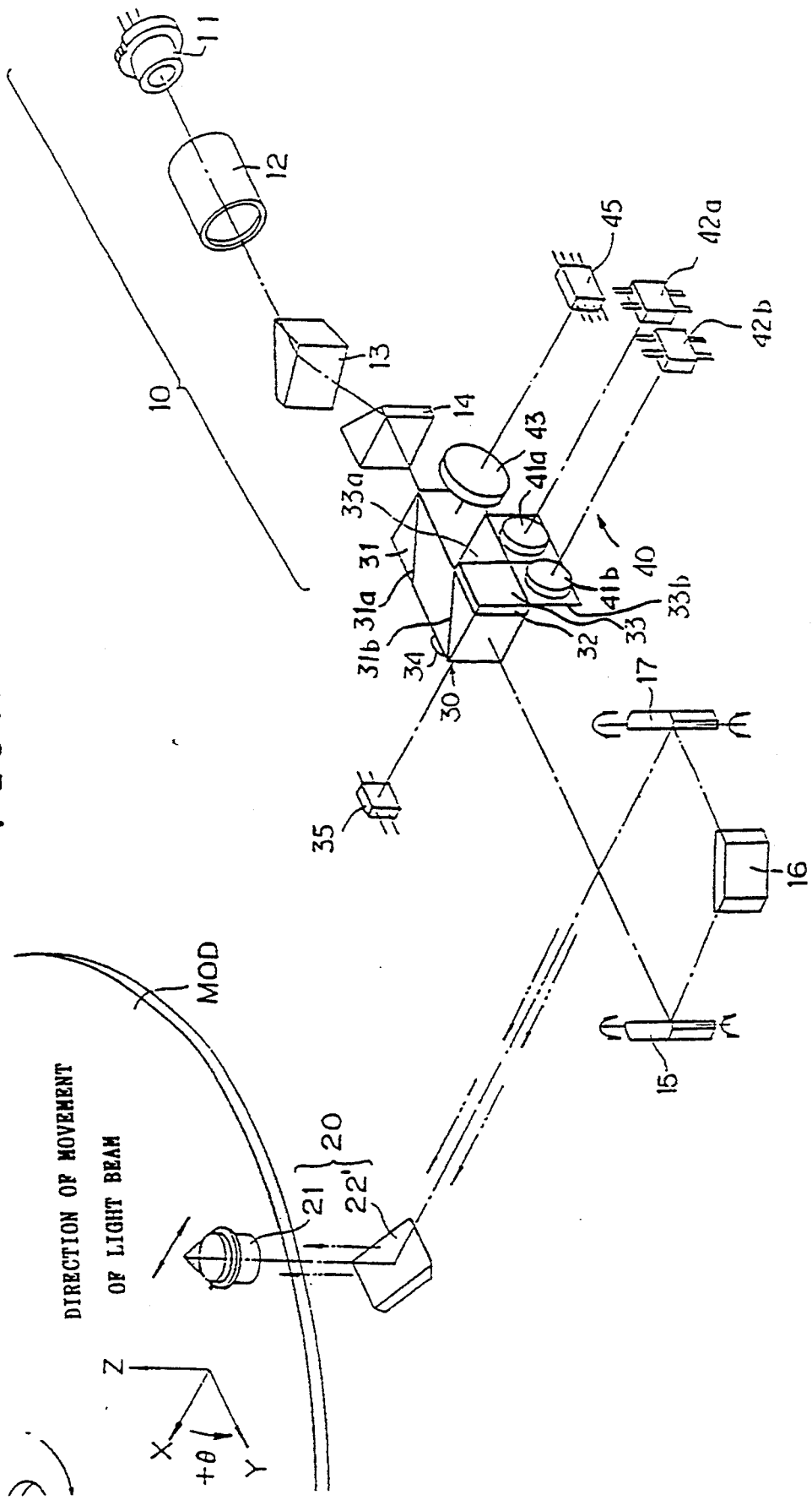
FIG. 17 is a schematic diagram illustrating an embodiment 6 of the optical disk apparatus according to this invention.
Figure 18:
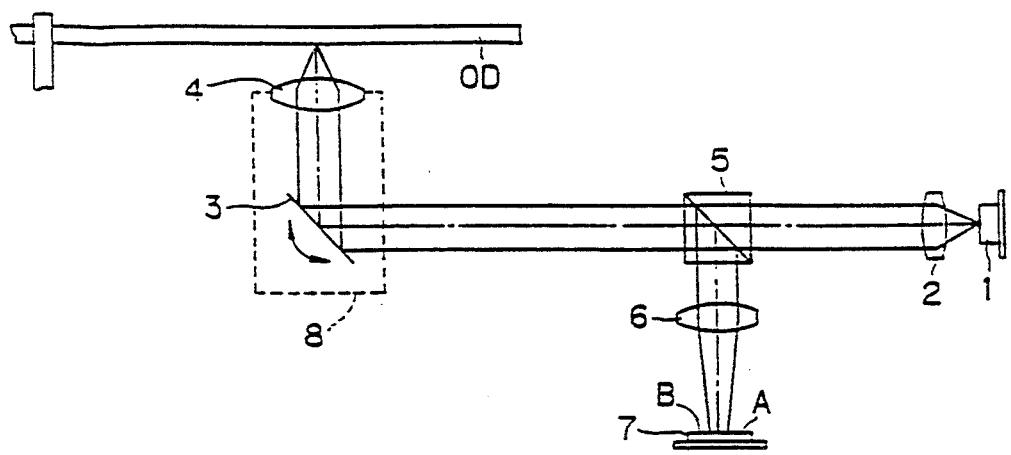
FIG. 18 is a schematic diagram of an optical system illustrating a conventional tracking error signal detector.

FIG. 17 shows an embodiment 6 of the present invention.

The apparatus of this embodiment is provided with a mirror 16 for extending an optical path and a second galvanic mirror 17 in the light source unit 10, and a fixed mirror 22 in the head. The first and second galvanic mirrors 15 and 17 are controlled so that the reflected light from the optical disk does not shift. Another arrangements are the same as the embodiment 5.

Since the apparatus of the embodiment 6 does not have a galvanic mirror in the head, it is possible to lighten the head and the speed of the seeking becomes higher than in the embodiment 5.

What is claimed is:

1. An optical disk apparatus, comprising:
   first and second galvanic mirrors disposed in an optical path between a laser source and an optical disk, which are rotated so as to move a light beam along a radial direction on said optical disk;
   a photodetector that is divided into at least two regions by a boundary line that corresponds to a tangential direction of said optical disk, and which receives a light beam guided from said optical disk to detect a tracking error signal;
   means for controlling an angle of said first galvanic mirror based on said tracking error signal so that a spot on said optical disk moves across tracks;
   means for detecting an angle of said first galvanic mirror;
   means for memorizing values of an angle of said second galvanic mirror corresponding to the angle of said first galvanic mirror so as not to change a position of a spot on said photodetector; and
   means for controlling the angle of said second galvanic mirror based on a value read from said memorizing means corresponding to the angle of said first galvanic mirror detected by said angle detecting means.

2. An optical disk apparatus, comprising:
   a galvanic mirror mounted for rotation for moving a spot formed on an optical disk across tracks;
   a photodetector that is divided into at least two regions by a boundary line that corresponds to a tangential direction of said optical disk, and which receives a light beam guided from said optical disk;
   means for subtracting outputs of said regions of said photodetector to output an original tracking error signal;
   a memory for storing correction values corresponding to rotation angles of said galvanic mirror, wherein said correction values are equivalent to track offset signals that are included in said original tracking error signals;
   means for detecting a rotation angle of said galvanic mirror;
   means for subtracting a correction value read from said memory corresponding to the angle detected by said angle detecting means from said original tracking error signal so as to create a tracking error signal; and
   means for driving said galvanic mirror according to said tracking error signal.

3. An optical disk apparatus, comprising:
   a first photodetecting portion that is divided into at least two regions by a boundary line that corresponds to a tangential direction of an optical disk, and which receives first and zero order defracted light that is guided from an optical disk;
   a second photodetecting portion that is divided into at least two regions by said boundary line that corresponds to said tangential direction of said optical disk, and which receives only zero order defracted light that is guided from said optical disk, wherein said second photodetecting portion is located at a position included in a light spot that is formed on a photodetector by light from said optical disc, even when said light spot moves along a direction that corresponds to a radial direction of said optical disk; and
   means for calculating outputs of said first and second photodetecting portions to output a tracking error signal, by modifying a signal representing a difference between outputs of first and second regions of said first photodetecting portion and subtracting said modified signal from a signal representing a difference between outputs of first and second regions of said second photodetecting portion, wherein said first photodetecting portion and said second photodetecting portion are arranged on at least one photodetector, said at least two regions of said second photodetecting portion being arranged at a peripheral area in said light spot about a direction that corresponds to a tangential direction of said optical disk, on said at least one photodetector.

4. An optical disk apparatus according to claim 3, wherein said calculating means calculates outputs of said first photodetecting portion and outputs of said second photodetecting portion to determine a tracking error signal according to the following relation:

$$TE = (E-F) - K(G-H)$$

where,
K represents a constant,
TE represents the tracking error signal,
E and F represent outputs of the two regions of the first photodetecting portion, and
G and H represent outputs of the two regions of the second photodetecting portion.

5. An optical disk apparatus comprising:
a first mirror that is rotatively disposed in an optical path between a light source and an optical disk so as to guide a light beam from said light source to said optical disk;
means for controlling an angle of said first mirror so as to move a beam spot on said optical disk along a radial direction;
means for receiving a light beam guided from said optical disk so as to detect a tracking error signal, said light beam receiving means having at least two regions that are divided by a boundary line that corresponds to a tangential direction of said optical disk; and
means for cancelling an influence of a deviation of a beam spot of said light beam receiving means from said boundary line that is caused by a change of said angle of said first mirror, said influence cancelling means comprising a second mirror that is rotatively disposed in said optical path;
means for controlling an angle of said first mirror based on said tracking error signal so that a spot on said optical disk moves across tracks;
means for detecting an angle of said first mirror;
means for memorizing values of an angle of said second mirror corresponding to an angle of said first mirror so as not to change a position of a spot on said light beam receiving means; and
means for controlling an angle of said second mirror based on a value read from said memorizing means corresponding to the angle of said first mirror detected by said angle detecting means.

6. An optical disk apparatus, comprising:
a mirror that is rotatably disposed in an optical path between a light source and an optical disk so as to guide a light beam from said light source to said optical disk;
means for controlling an angle of said mirrors so as to move a beam spot on said optical disk along a radial direction;
means for receiving a light beam guided from said optical disk so as to detect a tracking error signal, said light beam receiving means having at least two regions that are divided by a boundary line that corresponds to a tangential direction of said optical disk; and
means for cancelling an influence of a deviation of a beam spot on said light beam receiving means from said boundary line that is caused by a change of said angle of said mirror, said influence cancelling means comprising means for detecting an angle of said mirror, a memory that stores a compensation value that corresponds to a rotation angle of said mirror; and
means for calculating a final tracking error signal based on said tracking error signal, the detected angle of said mirror, and said compensation value.

7. An optical disk apparatus, comprising:
a mirror that is rotatably disposed in an optical path between a light source and an optical disk so as to guide a light beam from said light source to said optical disk;
means for controlling an angle of said mirror so as to move a beam spot on said optical disk along a radial direction;
means for receiving a light beam guided from said optical disk so as to detect a tracking error signal, said light beam receiving means having at least two regions that are divided by a boundary line that corresponds to a tangential direction of said optical disk; and
means for cancelling an influence of a deviation of a beam spot on said light beam receiving means for said boundary line that is caused by a change of said angle of said mirror, said influence cancelling means comprising means for receiving a specific portion of said light in a vicinity of said boundary line of said light beam receiving means, an output of said specific portion corresponding to a rotation angle of said mirror, said output of said specific portion being free of a tracking error signal component, and,
means for calculating outputs of said light beam receiving means and said specific position light beam receiving means to output a tracking error signal, wherein said light beam receiving means and said specific portion light beam receiving means are arranged on at least one photodetector, said at least two regions of said specific position light beam receiving means being arranged at a peripheral area in said beam spot about a direction that corresponds to a tangential direction of said optical disk, on said light beam receiving means.

8. The optical apparatus according to claim 7, said specific position light beam receiving means having at least two regions, said calculating means calculating outputs of said light beam receiving means and said specific position light beam receiving means to determine a tracking error signal according to the following relation:

$$TE = (E-F) - K(G-H)$$

where,
K represents a constant,
TE represents the tracking error signal,
E and F represent outputs of the two regions of said light beam receiving means, and
G and H represent outputs of the two regions of said specific position light beam receiving means.

9. An optical disk according to claim 7, said means for receiving a specific portion of said light comprising a pair of photodetecting areas which receive only zero order defracted light from said optical disk, another pair of photodetecting areas, which receive zero and first order defracted light from said optical disk, outputting the tracking error signal.

10. An optical disk apparatus, comprising:
two pairs of photographing areas, each pair of which are located in two regions divided by a boundary line that corresponds to a tangential direction of an optical disk, wherein one of said pairs of photographing areas only detects an overlapped portion of a first order diffracted light and a zero order diffracted light that are guided from an optical disk, and other one of said pairs of photodetecting areas detects only zero ordered defracted light that is guided from the optical disk;

means for subtracting an output of one of said pairs of photodetecting areas from an output of the other of said pairs of photodetecting areas; and means for providing a compensation for an output of said subtracting means to obtain a tracking error signal.

11. An optical disk apparatus according to claim 10, wherein said subtracting means and said compensation providing means calculate outputs of said pairs of photodetecting areas to determine a tracking error signal according to the following relation:

$$TE=(E-F)-K(G-H)$$

where,

K represents a constant,

TE represents the tracking error signal,

E and F represent outputs of regions of a first of said pair of photodetecting areas, and G and H represent outputs of regions of an other of said pair of photodetecting areas.

12. An optical disk apparatus, comprising:

a first photodetecting portion that is divided into at least two regions by a boundary line that corresponds to a tangential direction of an optical disk, and which receives first order and zero order defracted light from an optical disk;

a second photodetecting portion that is divided into at least two regions by said boundary line that corresponds to said tangential direction of said optical disk, and which receives only zero order defracted light from said optical disk; and means for calculating outputs of said first and second photodetecting portions to determine a tracking error signal, according to the following relation:

$$TE=(E-F)-K(G-H)$$

where,

K represents a constant,

TE represents the tracking error signal,

E and F represent outputs of the two regions of the first photodetecting portion, and G and H represent outputs of the two regions of the second photodetecting portion.

* * * * *

UNITED STATES PATENT AND TRADEMARK OFFICE
CERTIFICATE OF CORRECTION

PATENT NO. : 5,434,835
DATED : July 18, 1995
INVENTOR(S) : H. KONNO et al.

It is certified that error appears in the above-indentified patent and that said Letters Patent is hereby corrected as shown below:

On the cover, in section [57], Abstract, line 2, change "The" to ---An---.

On the cover, in section [57], Abstract, line 2, delete "of this invention".

On the cover, in section [57], Abstract, line 4, change "corresponding" to ---that corresponds---.

On the cover, in section [57], Abstract, line 4, change "mirror," to ---mirror.---.

On the cover, in section [57], Abstract, line 4, delete "or a".

On the cover, in section [57], Abstract, line 5, delete "photodetector having".

On the cover, in section [57], Abstract, line 5, before "two" insert ---A photodetector is included that has---.

On the cover, in section [57], Abstract, line 6, after "signals" insert ---with respect---.

On the cover, in section [57], Abstract, line 7, after "mirrors" insert ---and---.

UNITED STATES PATENT AND TRADEMARK OFFICE
CERTIFICATE OF CORRECTION

PATENT NO. : 5,434,835
DATED : July 18, 1995
INVENTOR(S) : H. KONNO et al.

It is certified that error appears in the above-indentified patent and that said Letters Patent is hereby corrected as shown below:

At column 12, line 36 (claim 3, line 5), change "defracted" to ---diffracted---.

At column 12, line 42 (claim 3, line 11), change "defracted" to ---diffracted---.

At column 12, line 46 (claim 3, line 15), change "disc" to ---disk---.

At column 13, line 11 (claim 5, line 1), change "apparatus" to ---apparatus,---.

At column 13, line 24 (claim 5, line 14), delete "and".

At column 13, line 26 (claim 5, line 16), change "of" to ---on---.

At column 13, line 44 (claim 6, line 2), change "rotatably" to ---rotatively---.

At column 13, line 48 (claim 6, line 6), change "mirrors" to ---mirror---.

UNITED STATES PATENT AND TRADEMARK OFFICE
CERTIFICATE OF CORRECTION

PATENT NO. : 5,434,835
DATED : July 18, 1995
INVENTOR(S) : H. KONNO et al.

It is certified that error appears in the above-indentified patent and that said Letters Patent is hereby corrected as shown below:

At column 14, line 1 (claim 7, line 2), change "rotatably" to ---rotatively---.

At column 14, line 13 (claim 7, line 14), delete "and".

At column 14, line 15 (claim 7, line 16), change "for" to ---from---.

At column 14, line 19 (claim 7, line 20), after "light" insert ---beam---.

At column 14, lines 23 and 24 (claim 7, lines 24 and 25), change "component," to ---component;---.

At column 14, line 56 (claim 9, line 4), change "defracted" to ---diffracted---.

At column 14, line 58 (claim 9, line 6), change "defracted" to ---diffracted---.

At column 14, line 61 (claim 10, line 2), change "photographing" to ---photodetecting---.

At column 14, line 62 (claim 10, line 3), change "are" to ---is---.

UNITED STATES PATENT AND TRADEMARK OFFICE
CERTIFICATE OF CORRECTION

PATENT NO. : 5,434,835

DATED : July 18, 1995

INVENTOR(S) : H. KONNO et al.

It is certified that error appears in the above-indentified patent and that said Letters Patent is hereby corrected as shown below:

At column 14, lines 64 and 65 (claim 10, lines 5 and 6), change "photographing" to ---photodetecting---.

At column 14, line 68 (claim 10, line 9), after "and" insert ---the---.

At column 15, line 1 (claim 10, line 10), change "ordered" to ---order---.

At column 15, line 1 (claim 10, line 10), change "defracted" to ---diffracted---.

At column 15, line 21 (claim 11, line 13), change "pair" to ---pairs---.

At column 15, line 22 (claim 11, line 14), change "an" to ---the---.

At column 15, line 23 (claim 11, line 15), change "pair" to ---pairs---.

UNITED STATES PATENT AND TRADEMARK OFFICE
CERTIFICATE OF CORRECTION

PATENT NO. : 5,434,835

DATED : July 18, 1995

INVENTOR(S) : H. Konno et al.

It is certified that error appears in the above-indentified patent and that said Letters Patent is hereby corrected as shown below:

At column 16, lines 4 and 5 (claim 12, lines 5 and 6), change "defracted" to ---diffracted---.

At column 16, line 10 (claim 12, line 11), change "defracted" to ---diffracted---.

Signed and Sealed this

Fifth Day of November, 1996

Attest:

BRUCE LEHMAN

*Attesting Officer*     *Commissioner of Patents and Trademarks*